United States Patent
Kordianowski et al.

(10) Patent No.: US 9,510,243 B2
(45) Date of Patent: Nov. 29, 2016

(54) METHOD AND SYSTEM FOR SETTING QUALITY OF SERVICE IN A COMMUNICATION SYSTEM

(71) Applicant: MOTOROLA SOLUTIONS, INC., Schaumburg, IL (US)

(72) Inventors: Adam Fryderyk Kordianowski, Krakow (PL); Piotr K Bartczak, Krakow (PL); Stefan Lukasz Koprowski, Myslenice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/947,062

(22) Filed: Nov. 20, 2015

(65) Prior Publication Data
US 2016/0157134 A1 Jun. 2, 2016

(30) Foreign Application Priority Data
Nov. 27, 2014 (EP) .................... 14460094

(51) Int. Cl.
*H04W 28/24* (2009.01)
*H04W 4/08* (2009.01)
(Continued)

(52) U.S. Cl.
CPC ............. *H04W 28/24* (2013.01); *H04W 4/08* (2013.01); *H04W 4/10* (2013.01); *H04W 88/16* (2013.01)

(58) Field of Classification Search
CPC . H04L 47/805; H04L 47/824; H04L 47/828; H04L 12/5695; H04L 29/12292; H04L 47/14; H04L 47/783; H04L 47/822; H04L 61/2069; H04W 28/24; H04W 72/087; H04W 76/02; H04W 8/26; H04W 28/26; H04W 4/22
See application file for complete search history.

(56) References Cited

U.S. PATENT DOCUMENTS 8,189,460 B2 5/2012 Shaffer et al.
9,307,370 B1 * 4/2016 Pai .................... H04W 4/10
(Continued)

FOREIGN PATENT DOCUMENTS

EP 1 671 437 A2 6/2006
EP 2 599 277 A1 6/2013
(Continued)

OTHER PUBLICATIONS

3GPP TS 23203 V9.9.0. (Jun. 2011): 3rd Generation Partnership Project; Technical Specification Group Services and System Aspects; Policy and Charging Control Architecture (Release 9), Retrieved from the Internet URL: http://www.qtc.jp/3GPP/Specs/23203-990.pdf, retrieved on Oct. 2, 2016, Jun. 2011, pp. 1-123.
(Continued)

*Primary Examiner* — Sujatha Sharma

(57) ABSTRACT

A method and apparatus for determining a Quality of Service (QoS) level in a mobile communication system comprises an access gateway. The access gateway receives an indication of a change of an active talk group of a first communication device operating on a first network. The access gateway formulates a QoS modification request message to forward to a second network. The message requests modification of the QoS for a second communication device that is receiving broadband service from the second network. The second communication device belongs to the same user as the first communication device. An interface between the network entity and the second network provides the QoS modification request message to the second network. The first communication device may be a portable or mobile radio, and the second communication device may be an LTE communication device. The first network may be a Land Mobile Radio system.

17 Claims, 7 Drawing Sheets

(51) Int. Cl.
*H04W 4/10* (2009.01)
*H04W 88/16* (2009.01)

(56) References Cited

U.S. PATENT DOCUMENTS

| | | | |
|---|---|---|---|
| 2009/0023460 A1 | 1/2009 | Cho et al. | |
| 2011/0021202 A1* | 1/2011 | Rosen | H04W 72/087 455/450 |
| 2011/0149875 A1* | 6/2011 | Ahuja | H04L 47/72 370/329 |
| 2011/0292798 A1* | 12/2011 | Manpuria | H04W 28/26 370/231 |
| 2013/0021965 A1 | 1/2013 | Chu et al. | |
| 2013/0136036 A1 | 5/2013 | Chen et al. | |
| 2015/0173107 A1* | 6/2015 | Newberg | H04W 76/005 455/416 |

FOREIGN PATENT DOCUMENTS

| | | | |
|---|---|---|---|
| EP | 2 599 341 A1 | | 6/2013 |
| EP | 2 599 361 A1 | | 6/2013 |
| SE | WO2012103954 | * | 8/2012 |
| WO | 2007/070603 A2 | | 6/2007 |
| WO | 2013/081759 A1 | | 6/2013 |

OTHER PUBLICATIONS

3rd Generation Partnership Project; Technical Specification Group Services and System Aspects; Study on architecture enhancements to support Group Communication System Enablers for LTE (GCSE LTE) (Release 12), 3GPP Standard; 3GPP TR 23.768, 3rd Generation Partnership Project (3GPP), Mobile Competence Centre; 650 Route Des Lucioles; F-06921 Sophia Antipolis Cedex; France; vol. SA WG2, No. V12.1.0, Jun. 20, 2014, KP050774122, pp. 1-63.

Gurbani V. and Jennings C., "Representing Trunk Groups in tel/sip Uniform Resource Identifiers (URIs)," Network Norking Group, Request for Comments: 4904, Category: Standards Track, Jun. 2007, Copyright (c) The IETF Trust (2007), Retrieved from the Internet URL: https://tools.ieff.org/html/rfc4904, retrieved on Oct. 2, 2016, pp. 1-19.

European Search Report for corresponding European Patent Application No. 14460094.7, mailed on Jun. 3, 2015.

Extended European Search Report and Written Opinion for corresponding European Patent Application No. 14460094.7, mailed on Sep. 23, 2015.

* cited by examiner

METHOD AND SYSTEM FOR SETTING QUALITY OF SERVICE IN A COMMUNICATION SYSTEM

FIELD OF THE DISCLOSURE

The present disclosure relates generally to communication systems and more particularly to setting Quality of Service (QoS).

BACKGROUND

In public safety systems, it is crucial to provide resources to public safety responders currently involved in, or about to be involved in, an important event. Such an event may be an emergency incident, which may occur in urban or rural environments. In case of system congestion, when there may not be enough resources to satisfy all the needs of the public safety responders, systems have to choose who should be granted access to valuable resources, and who should have access denied. Such decisions should, preferably, be made quickly.

In today's public safety environment, there may be a number of devices that are related to a particular public safety user. Such a public safety user may carry a land mobile radio (LMR) and, for example, one or more broadband devices. One or more of these devices may be connected to different access networks, using the same or different radio technologies.

In broadband LTE systems, control over network access and utilization of radio resources is achieved by setting particular Quality of Service (QoS) parameters. By setting particular QoS parameters, the system can for example provide particular Guaranteed Bitrates (GBR), prioritize service usage, and/or allow potential pre-emption using Allocation and Retention Priority (ARP).

There remains a need for an effective way to set QoS for one or more bearers allocated to one or more devices that are related to a particular public safety user involved in an important event. Furthermore, current technique tend to require a large amount of infrastructure to determine whether public safety responders should have access to, or be denied access to, these valuable resources.

Accordingly, there is a need for at least a method and system for coordinating the setting of QoS for one or more bearers for a set of communication devices related to a user.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
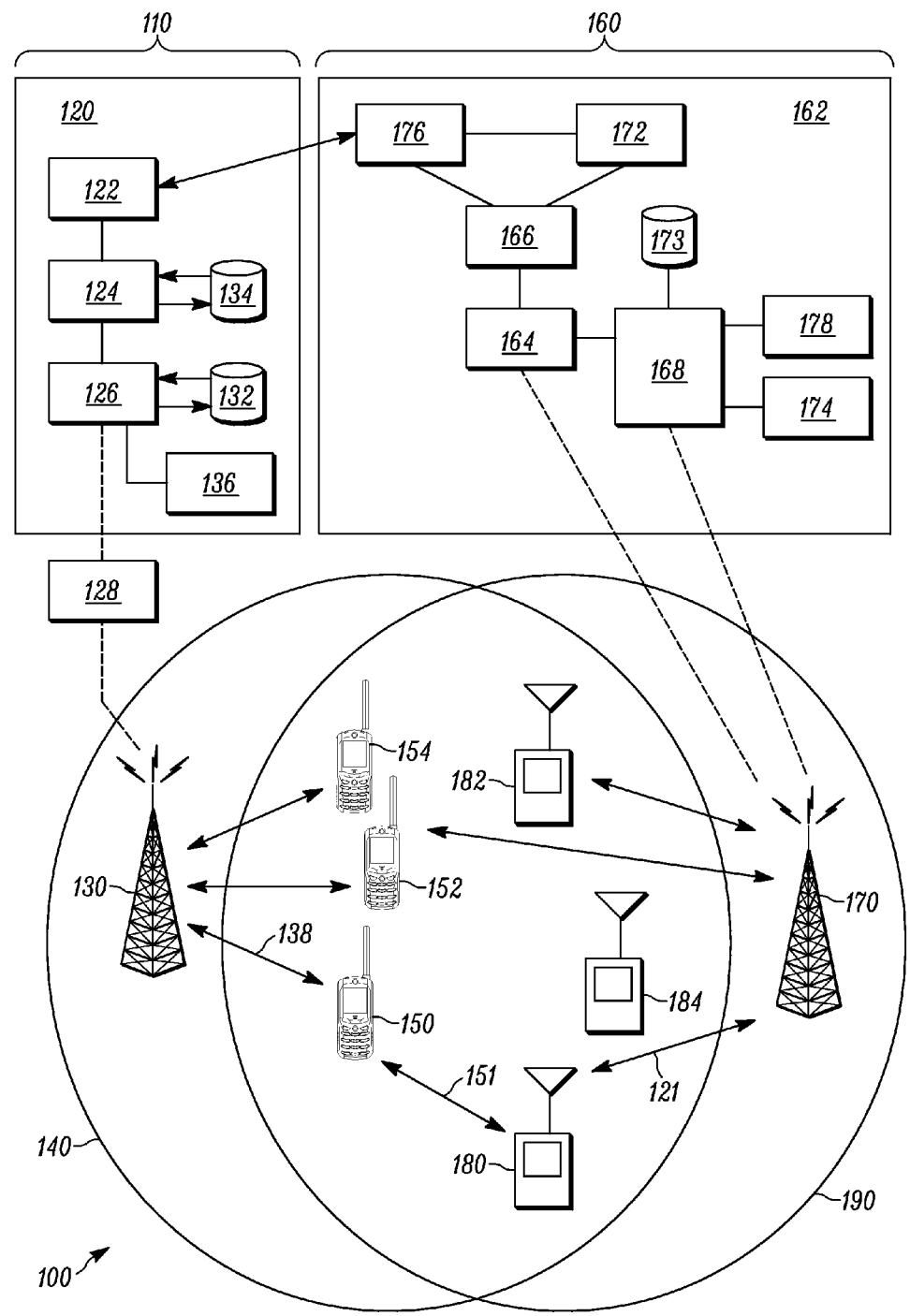
FIG. 1 is a block diagram of a wireless communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A network entity for determining a Quality of Service, QoS, level in a mobile communication system is provided. The network entity comprises an access gateway configured to receive an indication of a change of a talk group from a first communication device operating on a first network, and determine a second communication device associated with the first communication device, the second communication device operating on a second network. The access gateway is further configured to operate a QoS calculation function to determine a QoS modification, based on the received indication, and to formulate a QoS modification request message. The network entity also comprises an interface between the network entity and the second network. The interface is configured to provide the QoS modification request message to the second network, in order to allow the second network to adjust the QoS level of the second communication device.

Referring to FIG. 1 a wireless communication system 100 is shown in outline, in accordance with an example embodiment of the invention. The embodiment of FIG. 1 gives a brief overview of an application function of an embodiment.

In this example, the wireless communication system 100 comprises a first network 110 and a second network 160. The first network 110 and the second network 160 may be different network types. Here the 'network type' means the type of radio access technology or, in other words, the wireless access technology implemented to enable a communications device to access the network. Each of the first network 110 and the second network 160 can be of one network type or a combination of different network types, for example different types of cellular networks, 4G networks, 3G networks, broadband networks, or narrowband networks.

For illustrative purposes, the first network 110 in this example is a narrowband network, for example an LMR (Land Mobile Radio) or Project 25 network. Second network 160 is a broadband 4G network, for example WiMAX or LTE. Two different communication devices, such as a first communication device 150 and a second communication device 180, may be associated with one user. First communication device 150 is operable on first network 110. Second communication device 180 is operable on second network 160. In other embodiments, the first communication device 150 and the second communication device 180 may form different access technology portions of a single multifunctional device assigned to the user.

In some embodiments, a user may be associated with a first communication device 150 and more than one second communication device 180 operable on second network 160. In this case, where the functionality of the first network 110 and second network 160 are described below, this functionality may be repeated for each second communication device 180 that is associated with first communication device 150.

The first network 110 comprises a core network 120 and a radio access network (RAN) 140. RAN 140 is illustrated generally by the coverage area around an LMR station 130. For example, RAN 140 may comprise at least one LMR station 130, controlled via an LMR network zone controller 128 within the core network 120. In some examples, the LMR network zone controller 128 may receive instructions from a public safety agency (not shown) which may be outside or within the core network 120. The functionality of first network 110 is described with respect to first communication device 150, but these functions may also apply to some or all of other communication devices 152, 154 operable in first network 110. The first communication device 150 and other communication devices 152 and 154 operable on the first network 110 may be LMRS (land mobile radio system) devices.

The LMR station 130 may allow the first communication device 150 to receive and transmit voice information from/to the other communication devices 152 and 154 within the coverage area of the LMR station 130, via wireless communication link 138 for example. Communication device 154, for example, may itself be associated with a communication device 182 operable on second network 160.

An Application Function 136, which is described in detail later, is illustrated as part of core network 120. However, the Application Function may be located elsewhere within first network 110, or within second network 160. Alternatively, the Application Function may be located separately from both first network 110 and second network 160.

Second network 160 may additionally comprise a second core network 162 and a second RAN 190. Second RAN 190 is illustrated generally by the coverage area around eNodeB 170, which functions as a base station.

Second core network 162 may comprise a packet data network gateway (P-GW) 166. In order to serve up local content, the P-GW 166 may be coupled to a content provider 172. The P-GW 166 may be further coupled to a policy control and rules function entity (PCRF) 176 and a gateway 164. Second communication device 180 operates within second RAN 190. The functionality of second network 160 is described with respect to second communication device 180, but these functions may also apply to some or all of other communication devices 182, 184 operable in second network 160.

PCRF 176 is operable to control policy control decision making. PCRF 176 is also operable to control flow-based charging functionalities in a policy control enforcement function (PCEF) (not shown), which may reside in the P-GW 166. PCRF 176 further provides a Quality of Service (QoS) authorization class identifier and bit rate information that dictates how a certain data flow will be treated in the PCEF, and ensures that this is in accordance with a subscription profile of second communication device 180.

In this example, the gateway 164 is a Serving Gateway (S-GW), which is coupled to a mobility management entity (MME) 168. The MME 168 is operable to manage session control of Gateway bearers and is operably coupled to a home subscriber server (HSS) database 173. HSS database 173 is arranged to store information about the subscriber of second communication device 180. MME 168 also has direct connection to eNodeB 170.

HSS database 173 may store communication device subscription data such as QoS profiles and any access restrictions for roaming HSS database 173 may also store information relating to the P-GW 166 to which second communication device 180 can connect. In addition, HSS database 173 may hold dynamic information relating to the identity of the MME 168 to which a second communication device 180 is currently connected or registered.

The MME 168 may be further operable to control protocols running between second communication device 180 and second core network 162. The MME 168 supports functions relating to bearer management, such as the establishment, maintenance and release of bearers.

The gateway 164 acts as a mobility anchor point and is capable of providing internet protocol (IP) multicast distribution of user plane data to eNodeB 170. The gateway 164 may receive content via the P-GW 166, from one or more content providers 172. The MME 168 may be further coupled to an evolved serving mobile location center (E-SMLC) 174 and a gateway mobile location center (GMLC) 178. GMLC 178 contains functionalities required to support location services.

The PCEF of P-GW 166 is operable to determine QoS enforcement and flow-based charging according to rules received from the PCRF 176. The P-GW 166 is further operable to control the filtering of downlink user IP packets into different QoS-based bearers (not shown).

As illustrated in FIG. 1, second core network 162 is operably coupled to eNodeB 170, which provides a coverage zone for second RAN 190. The eNodeB 170 performs base station functions, and a wireless communication system will typically have many eNodeBs. The eNodeB 170 controls and manages the radio resource related functions of second communication device 180.

First communication device 150 may be any type of device that can provide functionality related to use with a talk group, such as a two-way radio. Second communication device 180 may be any type of communication device such as a mobile phone, mobile data terminal, personal digital assistant, laptop, cell phone etc.

First network 110 and second network 160 provide a system for coordinating the setting of QoS for one or more bearers for a set of communication devices, when a first communication device 150 and a second communication device 180 are associated with a user. The result may be a simpler determination than that made by current systems as to whether a user should be allocated resources for one or more bearers for a set of associated communication devices. An application function 136 of core network 120 allows the setting of QoS for one or more bearers for the second communication device 180, or other communication devices 182, 184 operable on the second network 160, when the second communication device is associated with the same user as the first communication device 150. The application function is explained in more detail in connection with FIG. 3. In some examples, the application function 136 may be separate from the core network 120. In some other examples, the application function 136 may be situated within the core network 120. Application function 136 may be implemented on top of the standard LTE functionality within the core network 120.

LMR gateway 126 is operable to receive information from the LMR station 130, via the LMR network zone controller 128, relating to first communication device 150 and other communication devices 152, 154 operable in the first network 110. The received information may relate to an indication of a change of a talk group of first communication device 150. The indication of a change of talk group may relate to a change from a current talk group. Alternatively, a user may have just enabled, i.e. switched on, first communication device 150. In this case, the indication of a change of talk group will relate to an initial talk group.

Figure 3:
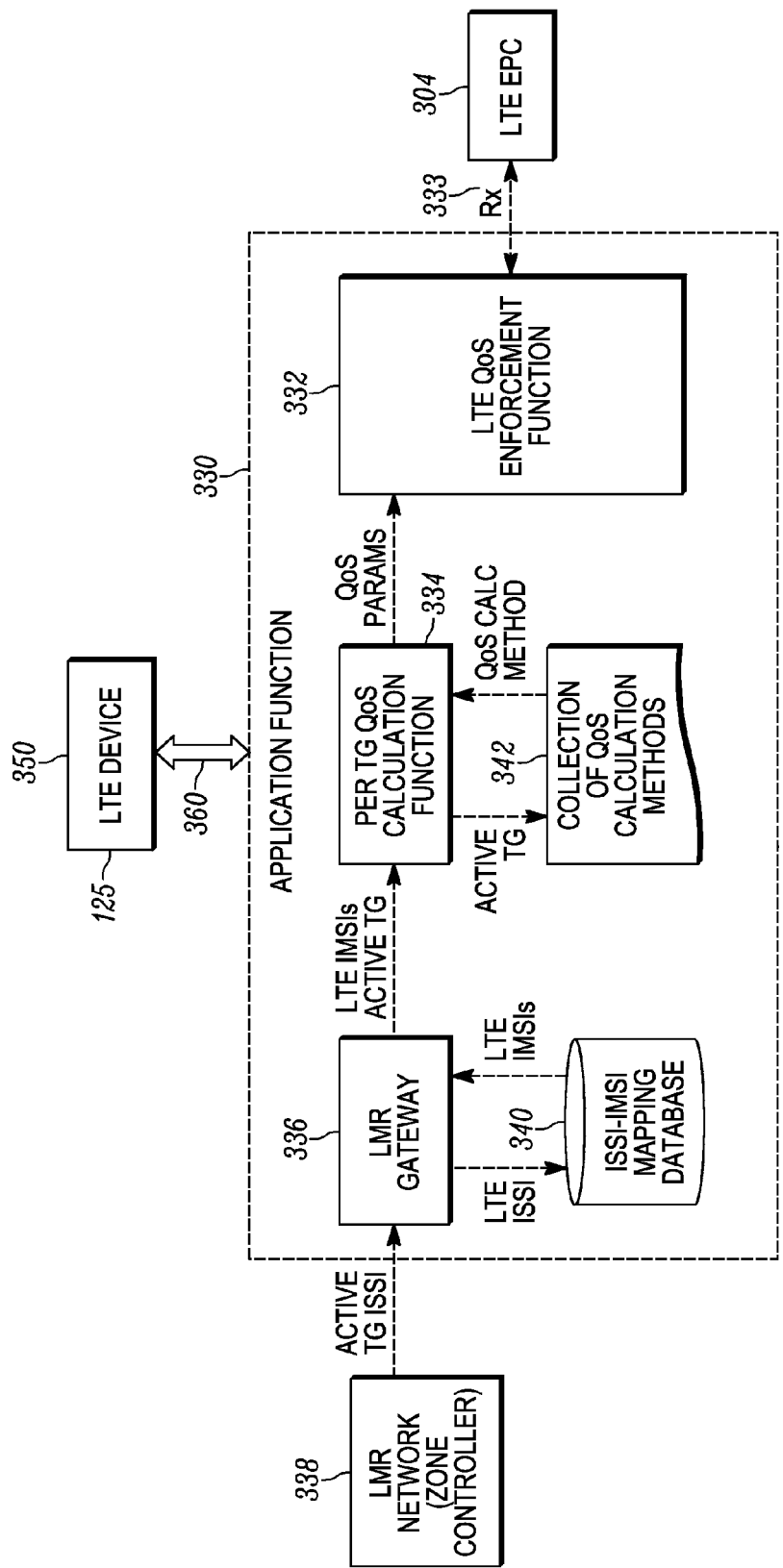
FIG. 3 is a block diagram of an application function, in accordance with some embodiments.

LMR gateway 126 identifies relevant devices in the second network by using information from first database 132, before passing the processed information onto a QoS calculation function 334, which is explained in greater detail in relation to FIG. 3. The QoS calculation function 334 uses the information to determine from second database 134 a suitable QoS calculation method. Second database 134 comprises a number of possible QoS calculation methods. The QoS calculation function 334 then passes information and QoS parameters onto an LTE QoS enforcement function 122. The LTE QoS enforcement function 122 may then transmit a message to the PCRF 176 within the second core network 162. The message may comprise service data flows (SDFs) relating to new SDF establishment, modification of existing SDFs and termination of SDFs within the second core network 162.

In some other examples, the application function 136 may be situated within the second core network 162, for example implemented on top of the standard LTE functionality within the second core network 162.

In summary, the application function 136 uses an indication of a change of talk group of first communication device 150 to implement a change in the services provided to associated second communication device 180.

In one example, first communication device 150 may be a mission critical LMRS device, assigned to a first talk group and used for voice communication. Subsequently, the user of the first communication device 150 may change the user's talk group. In this case, the user may change from the first talk group to a second talk group. The user may wish to do this when the user decides to join, or is assigned to, an event requiring participation in a new talk group. The user may simply switch to the second talk group by utilizing functionality on the first communication device 150. In other examples, the user may utilize a 'scan list' feature on the first communication device 150 to listen to talk groups on the scan list in addition to his main, first, talk group, and select a relevant talk group from this list. In some other examples, first communication device 150 may have been recently 'switched on' and, therefore, may not have initially been assigned a current talk group. As a result, the indication of a change of talk group may not be from a current talk group to a second talk group, but rather commencement with an initial talk group.

The second communication device 180 may already be attached and authenticated to the second network 160 via eNodeB 170. The application function 136 may therefore be aware of the attached communication device 180 utilizing standard SDF establishment, modification etc. as per current 3GPP standards. One exemplary method for the application function 136 to become aware of a user's associated second communication device 180 is for dedicated software on the second communication device 180 to inform proactively the application function 136 AF. In a second exemplary method, application function 136 may subscribe in the PCRF 176 for events. Such events may indicate the fact that the second communication device 180 has attached to the second core network 162, for example that an SDF was created or PCC rules were activated.

The LMR gateway 126 may subsequently determine the current talk group of the first communication device 150, in this example the second talk group, and pass this information to first database 132. The LMR gateway 126 may obtain and map the inter RF subsystem interface (ISSI) of first communication device 150 in first database 132, in order to obtain international mobile subscriber identity (IMSI) information for associated second communication device 180. When the user's associated second communication device 180 has previously attached to and been authenticated by the second network 160, the first database 132 within the application function 136 is aware of it. First database 132 is, therefore, able to identify the associated second communication device 180 using the ISSI of the first communication device 150.

Subsequently, the LMR gateway 126 may output the details of the currently selected talk group of the first communication device 150 with details of associated IMSI(s) of associated second communication device(s) 180 to the QoS calculation function 124. Subsequently, the QoS calculation function 124 may select a relevant QoS calculation method based on the received information relating to current talk group and IMSI information. For the associated second communication device 180, the QoS calculation function 124 sends QoS modification requests to the PCRF 176 within the second core network 162 of the second network 160. As discussed above, the application function 136 may be separate to, or integrated within, second core network 162 of second network 160.

The PCRF 176 may subsequently calculate QoS parameters for the bearers of the associated second communication device 180, and modify the QoS rules for the second communication device 180. Further, QoS for data links established for each affected communication device 182, 184 operable on second network 160 may be updated accordingly. Therefore, in some examples, a communication device 182 that is operable in second network 160 but is not associated with the user's first communication device 150, may have its QoS parameters changed in order to allow second communication device 180 to, for example, achieve higher bit rate communications.

In another example, a peer-to-peer link 151 may be established between first communication device 150 and second communication device 180. In some examples, the peer-to-peer link 151 may utilize one of, for example, Bluetooth™, infra-red, Wi-Fi™ and near-field communication (NFC). In this example, first communication device 150 may inform second communication device 180 of its change of talk group via the peer-to-peer link 151. Therefore, optionally, the information relating to a change of talk group of first communication device 150 may be provided to the application function 136 via the second communication device 180. Further, information relating to the 'ISSI' of first communication device 150 may also be provided to second communication device 180 via the peer-to-peer link 151. Therefore, in some examples, the LMR network zone controller 128 may be bypassed in terms of providing talk group and ISSI information. This may have an advantage of simplifying the procedure for allocating resources for one or more bearers for second communication device 180 associated with the user of first communication device 150.

In some examples, a user may utilize an enhanced communication device, which may comprise a combination of the functionality of first communication device 150 and second communication device 180. Therefore, in this example, a peer-to-peer link 151 may not be required, as information relating to talk-group, ISSI and IMSI may already be shared between the communication device via a direct link that is internal to the device.

Application function 136 allows a user of a first communication device 150, who may be involved in an event or may have just left an event, to switch the talk group of his first communication device 150, and have the QoS of an associated second communication device 180 dynamically changed in response to switching the talk group of first communication device 150. Thus application function 136 may allow a simplified procedure for altering QoS of second communication device 180 associated with first communication device 150, and of any other communication devices operable other networks when those devices are associated with first communication device 150. A user may base his/her choice of talk group on, for example, location, trajectory, proximity to an incident, job role, etc. In addition, the priorities for each of the talk groups may define a level of access (QoS), to produce a more flexible system compared to what is currently available in known systems. The change in talk group, when a first communication device 150 has just been enabled and there is no current talk group, may take the form of an indication of an initial talk group.

Each of first network 110 and second network 160 can span one or more logical jurisdictions, wherein a jurisdiction can be defined by a geographic boundary that includes one or more cells or as defined by geo-coordinates or mapping coordinates. Each cell may represent a geographic coverage area that may provide the wireless resources and/or wired resources, also termed herein as bearers, for carrying data (or SDFs) for communication devices connected to the radio access network of that cell. Each cell is defined as being inclusive of a single base station's coverage area or a portion of a base station coverage area and can be identified by a cell identifier.

As used herein, the term bearer may be defined as a transmission path in a wireless network (e.g. RAN). A bearer may be used to carry wireless device data traffic, which are also termed as communications or service data flows 'SDFs'. A bearer can have both an uplink path from second communication device 180 to the second core network 162, and a downlink path from second core network 162 to second communication device 180. A bearer can be unidirectional, such as a common point-to-multipoint (PTM) downlink path for multicast or broadcast traffic. A bearer can be point-to-point (PTP) (such as a dedicated bearer or a default bearer in an LTE network associated with a single device), or a PTM bearer (such as a multicast or broadcast bearer associated with one or more devices). A bearer in an LTE network may be a default bearer, or a dedicated bearer. A bearer can be characterized by a level of Quality of Service. Quality of Service refers to resource reservation control mechanisms, and may include: bearer allocation, retention, and pre-emption, scheduling priority for packets, level of performance of SDFs, admission priority, packet latency, packet loss rate, effective bandwidth, minimum bandwidth, maximum bandwidth, required bit rate, delay, jitter, packet dropping probability, and/or error rate may be guaranteed.

QoS, and hence priority, may be determined based on one or more QoS parameters included in a set of Policy and Charging Control (PCC) rules selected for the wireless device. The PCC rules may include one or more QoS rules of parameters, billing and charging rules, authorization rules or rules about which applications can be used, and which types of bearers may or may not be established or allocated to second communication device 180.

In some examples, the indication of a change of talk group may be an indication of a change of a current talk group of the first communication device 150. However, the indication of a change of talk group may be an indication that the first communication device 150 has switched on and has attached to a particular talk group. The first network 110 may be a public safety network and the first communication device 150 may be a portable or mobile radio.

In some examples, the LMR network zone controller 128 may provide an indication of the change of talk group of the first communication device 150. The first communication device 150 may report the change of talk group to the second communication device 180 via peer-to-peer link 151, wherein the second communication device 180 may provide the reported change of talk group of the first communication device 150 via the second network 160 to the relevant network entity, for example LMR gateway 126.

In some examples, an access gateway, for example the LMR gateway 126, may be configured to receive information relating to an inter RF subsystem interface, ISSI, of first communication device 150. Further, the access gateway may be additionally configured to map the ISSI information to a database of international mobile subscriber identities, IMSIs, whereby the access gateway determines the second communication device 180 associated with the first communication device 150.

In some examples, the QoS calculation function 334 may determine a set of active services for second communication device 180. Here, the set of active services may at least partially determine changes to currently active services including one or more bearers currently active in the second network, further services that may be activated later for the second communication device 180, and services activated during attachment of the device to the second network 160. The second network 160 may decide whether or not the second communication device 180 can attach immediately, based on whether or not a calculated QoS value for the second communication device 180 permits attachment to the second network. In some examples, the QoS calculation function 334 maps the indication to a database of calculation methods to generate the QoS modification request message. The QoS modification message may comprise one of: application identification; media type; requested priority; maximum guaranteed bit rate; IP address; ports; direction; or protocol. In some examples, the QoS calculation function 334 may transmit a QoS modification request message for each service identified for the second communication device 180.

In some examples, the access gateway, for example the LMR gateway 126, may be configured, based on a received indication, to determine a plurality of other communication devices that are associated with the first communication device 150 and that operate on second network 160 or other communication networks. In this case, the interface is configured to provide the QoS modification request message to the second network 160 and to the other communication networks, in order to allow the second network 160 and the other communication networks to adjust the QoS level of each of the other communication devices.

In some examples, the second network 160 is an LTE network providing broadband services to the second communication device 180 and wherein the network entity, for example application function 136, is implemented as additional functionality in an AF of the second network 160. In some other examples, the network entity, for example application function 136, may be implemented as a stand-alone device, wherein an interface links the access gateway of the network entity to an AF of the second network 160.

In some examples, a minimum period between formulating a first QoS modification request message and formulating a second QoS modification request message may be provided. Alternatively, a minimum period between transmitting successive QoS modification request messages to the second network 160 may be provided, thereby preventing adjustments of the QoS level of the second communication device 180 from being made with a frequency that exceeds an acceptable level. In some examples, the minimum period may be set so that two consecutive indications of talk group change for the same first communication device 150 are not processed within the time limit set by a debounce timer. The debounce timer may be configured to discard all talk-group change notifications which are generated during the period for which the timer is running, except the last one that is generated before the end of the time period. The last one will then be processed after expiration of the timer, and hence this last notification of a change of talk-group is not lost.

In some examples, a controller, for example QoS calculation function 334, may be part of the application function 136, is configured to transmit updated QoS parameters for one or more bearers of the second communication device 180 to the Policy and Charging Enforcement Function (PCEF) of P-GW 166 within the second network 160. The Policy and Charging Enforcement Function (PCEF) then applies the updated QoS parameters within the second network 160. In some examples, the controller may be configured to calculate and transmit updated QoS parameters for bearers for each function of the second communication device 180, based on the received QoS modification message. The controller will re-calculate the QoS for any new SDF(s) that are created later, after the talkgroup has already been changed.

Figure 2:
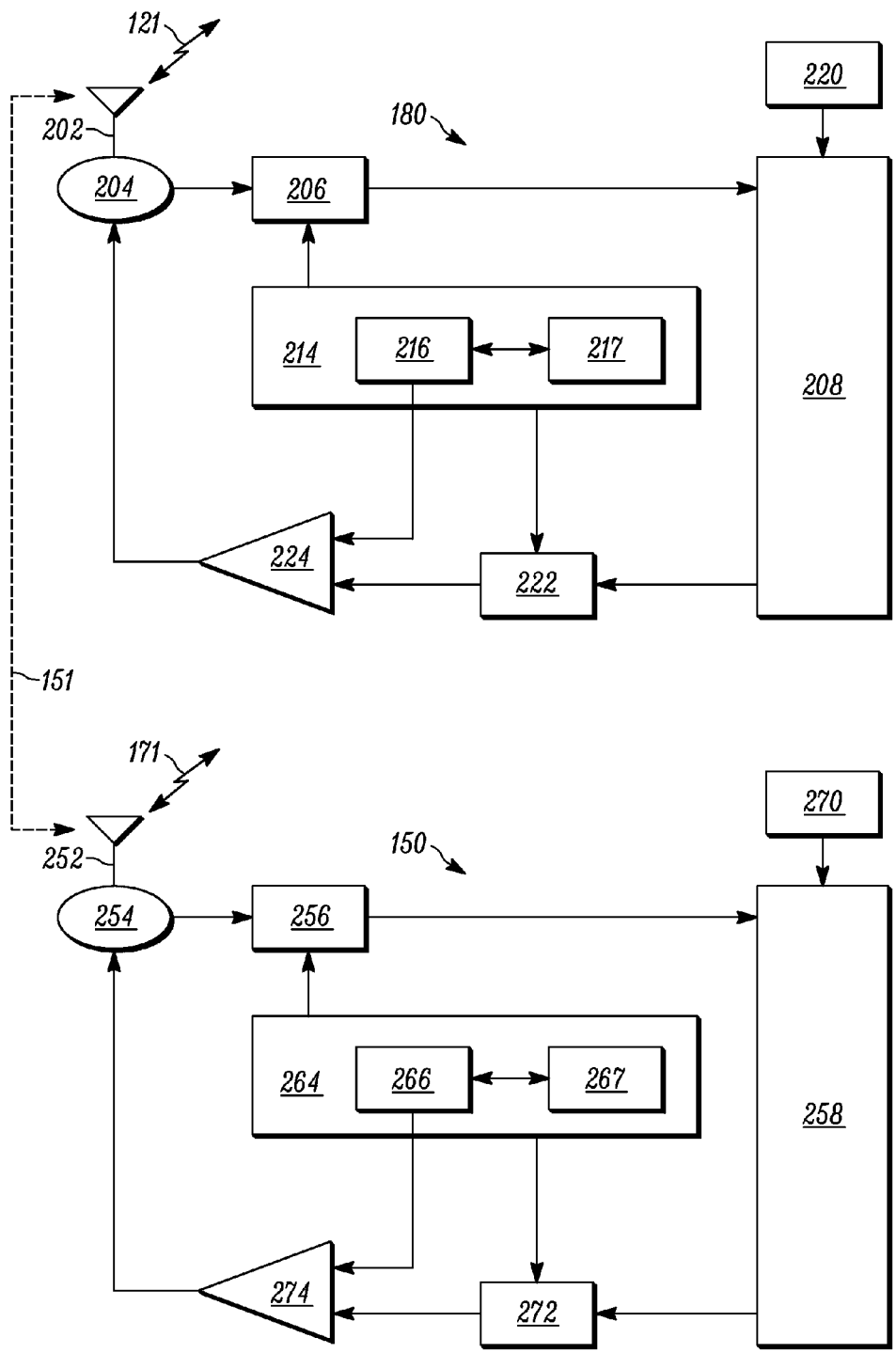
FIG. 2 is a block diagram of communication devices, in accordance with some embodiments.

FIG. 2 illustrates more detailed block diagrams of first communication device 150 and second communication device 180 of FIG. 1.

Second communication device 180 may be a broadband portable device operating on an LTE network. Second communication device 180 may alternatively be a mobile data terminal device, for example situated within a vehicle of a public safety user. Second communication device 180 comprises an antenna 202, for receiving transmissions 121, coupled to an antenna switch or duplexer 204 that provides isolation between receive and transmit chains within the second communication device 180. One or more receiver chains include receiver front-end circuitry 206, which is coupled to a signal processing module 208.

Controller 214 maintains overall operational control of the second communication device 180. The controller 214 is also coupled to the receiver front-end circuitry 206 and the signal processing module 208. In some examples, the controller 214 is also coupled to a buffer module 217 and a memory device 216. The transmit chain includes an input module 220, coupled in series through transmitter/modulation circuitry 222 and a power amplifier 224 to the antenna 202, antenna array, or plurality of antennas. The various components within second communication device 180 can be realized in discrete or integrated component form.

The first communication device 150, comprises similar functionality to second communication device 180. The references for corresponding elements of first communication device 150 have reference signs increased by 50 relative to the same components of second communication device 180.

Direct peer-to-peer link 151 may be employed, in some embodiments, between first communication device 154 and second communication device 182. Peer-to-peer link 151 may allow information relating to the second communication device 180 and first communication device 150 to be transferred. For example, ISSI and talk group information may be transferred from the first communication device 150 to the second communication device 180.

Although first communication device 150 and second communication device 180 are shown as separate devices, they may form different functional elements of a single device assigned to the user, in which case the peer-to-peer link 151 would be an internal link within the single device.

FIG. 3 illustrates in detailed an example of an application function 330. In this example, the application function 330 is implemented on top of a standard LTE application function, within the LTE network, for example as a set of extensions. Therefore, in some examples the application function 330 may be an LTE application function. In other examples, the application function 330 may be implemented as an external element, separate from the LTE network. For example, the application function may be situated between first network 110, for example a narrowband network, and second network 160, for example a broadband network.

In this example, a user may carry a primary communication device, for example first communication device 150, which may be an LMRS device, and a number of associated secondary communication devices, for example second communication device 180 and other such devices. Second communication devices 180 may be mobile broadband LTE device, and the other secondary communication devices carried by the user may be mobile broadband LTE devices or devices using other access technologies.

In some examples, the user's secondary communication devices may already have successfully attached to and been authenticated by the LTE Evolved Packet Core (EPC) 304 of second network 160, with active data links 360 established by the application function 330, as per the standard SDF establishment procedure.

The user, at some point in time, may determine that a different talk group is required for his primary communication device. This determination may be based, for example, on the user's location, trajectory, proximity to an event etc. Alternatively, a talk group change may be made on the user's device by LMR network zone controller 338.

In some other examples, the user may enable, i.e. switch-on, first communication device 150, at which point the first communication device 150 initially connects to a talk group. This may also then result in an indication of a change of talk group being transmitted.

In some other examples, the user of the primary communication device, which may have LMRS radio with talk group scan list function enabled, may select an active talk group by responding to an incoming PTT (push to talk) voice call transmitted on the scanned talk group.

The active talk group selected by the user on first communication device 150 may be signaled to LMR network zone controller 338. The LMR network zone controller 338 may subsequently, pass information that may relate to the user's current selected active talk group and ISSI information to LMR gateway 336 within the application function 330. In some other examples, the active talk group selected by the user may be signaled via peer-to-peer link 151 to one or more secondary devices and then to the application function 330. Subsequently, details of the active talk group and ISSI information of the primary communication device may be transferred to third database 340 and LMR gateway 336.

LMR gateway 336 may pass ISSI information to third database 340, which may be an ISSI-IMSI mapping database. Therefore, the application function 330, via the LMR gateway 336, may identify secondary communication devices associated with the ISSI of the primary communication device. In one example, the LMR gateway 336 may map ISSI information of first communication device 150 with LTE IMSI information of one or more secondary communication devices associated with the same user.

Subsequently, in some examples, the LMR gateway 336 may determine if the talk group of the primary communication device changes too often, for example by utilizing a debounce timer. If it is determined that the talk group changes too often, the LMR gateway 336 may wait until it is established that the talk group does not change too often, before passing information relating to LTE IMSIs and the current active talk group to a QoS calculation function 334. This may have an advantage of reducing processing within the application function 330 until a user has selected the correct/desired talk group.

The QoS calculation function 334 may base the QoS calculation method on the user's current active talk group. For example, the QoS calculation function 334 may take into account talk group identification (ID) in order to determine a QoS calculation method from fourth database 342. Therefore, in some examples, the QoS calculation function 334 may take into account talk group ID mapping to support services and priorities. Table 1 provides an example of a talk group mapping table that may be utilized by the QoS calculation function 334 is illustrated. The QoS calculation methods may be pre-populated in fourth database 342, in order to allow adjustment of the QoS for each specific talk group that is set up.

Therefore, in some examples, the QoS calculation function 334 may take into consideration the priority of the user's current active talk group when determining a QoS calculation method from fourth database 342. Similarly, the QoS calculation function 334 may further take into consideration the supported services for the relevant talk group.

QoS parameters may be transmitted from the QoS calculation function 334 to an LTE QoA enforcement function, to allow a QoS request to be generated.

In some examples, the LTE QoS enforcement function 332 may determine the current active services for each secondary communication device associated with the primary communication device and, for each identified service, map the talk group requirements to a corresponding set of rules to allow a QoS request to be generated.

TABLE 1

| Talk Group ID | Supported Services | Priority |
|---|---|---|
| 1 | Video | 1 |
|  | Audio | 1 |
| 2 | Video | 2 |
|  | Audio | 1 |
| 3 | Video | 3 |
|  | Audio | 1 |
| 4 | Video | 4 |
|  | Audio | 4 |
| 5 | Audio | 5 |

A QoS request may comprise one or more of information pertaining to: application ID, media type, requested priority, max GBR, IP address, ports, direction and protocol.

In some examples, the LTE QoS enforcement function 332 may, for each service identified for the associated secondary communication device(s), transmit 333 QoS modification requests to the LTE EPC 304. This permits the calculation/installation/enforcement/termination of QoS rules. In some examples, the QoS modification requests may be transmitted via a standard Rx interface between the application function 330 and a PCRF of the LTE control network.

Subsequently, the LTE control network within the LTE EPC 304 may calculate QoS parameters based on the received QoS modification requests for existing user's bearers, and modify its QoS rules accordingly. As a result, QoS for data links established for each associated secondary communication device may receive updated rules accordingly.

In some examples, prior to operation, the application function 330 may be configured or programmed with information to facilitate its functionality upon receiving information relating to a change of talk group, for example.

In one example, one or more agency administrators may configure aspects of the application function 330 through an API (application programming interface) (not shown), with policy rules to apply with regards to bearer QoS and/or applications running on one or more communication devices. For example, the application function 330 may be configured with an identification of available applications, supported by the communication devices, for example second communication device 180 and possibly other secondary communication devices. In one exemplary implementation, applications may be launched and provided with different QoS, depending on the identified active talk group of the first communication device 150. This may be implemented by assigning a QoS level to some of the talkgroups, and using "default QoS" values for the rest of the talkgroups.

In some examples, the LTE EPC 304 may be operable to configure or reconfigure established bearers by performing one or more of the following: changing allocation and retention priority (ARP) of one or more bearers; changing the pre-emption capable flag of one or more bearers; changing the pre-emption vulnerability flag of one or more bearers; changing the bearer(s) from best-effort to dedicated and vice-versa, changing the guaranteed bit-rate (GBR) and maximum bit-rate (MBR) for one or more bearers; changing the responder's access class; changing the QCI of one or more bearers; or allowing some bearers but not others, allowing some applications but not others, allocating additional bearers. In some systems, the exact configuration response is subject to negotiation with the carrier. Assigning different QoS levels to different LMR 'talk groups' may provide a simple and flexible system for users, allowing better management of LTE resources based on activities in the LMR network, when compared to known systems.

There are various ways in which an SDF may be established. Second communication device 180 may use a default bearer to make a request to the application function 330 for a new service. Application function 330 will calculate the QoS parameters for the new service, and will request that the PCRF 176 create a new SDF. The PCRF 176 will create the new SDF in accordance with the currently selected talk-group. The PCRF 176 will install the appropriate QoS rules on the PCEF of P-GW 166.

Figure 4:
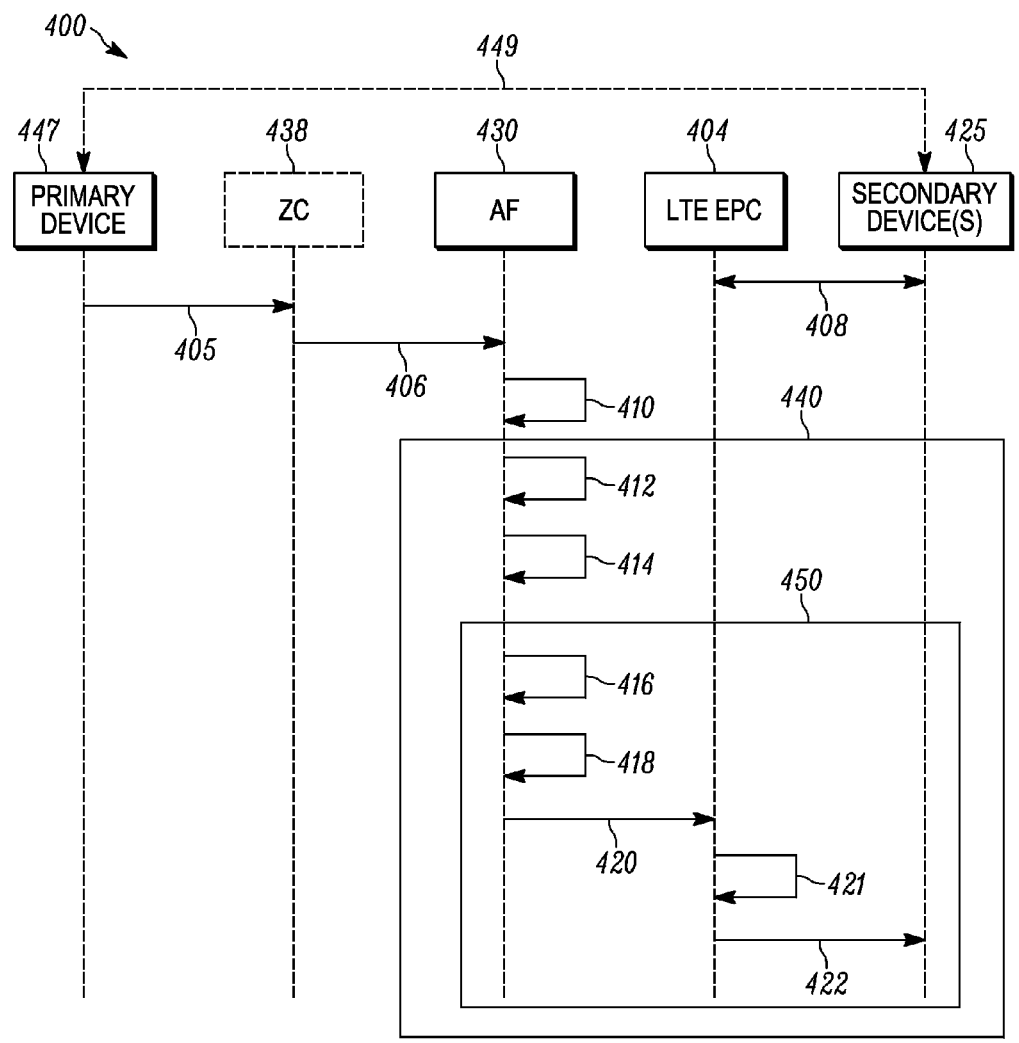
FIG. 4 is a message sequence chart, in accordance with some embodiments.

Referring to FIG. 4, message sequence chart 400 illustrates an example implementation of the invention.

Message sequence chart 400 comprises a primary communication device 447, which may be first communication device 150. LMR network zone controller 438 is a necessary part of first communication system 110, but is only optional for implementation of the invention. Application function 430 may be the application function illustrated in FIGS. 1 and 3.

LTE EPC 404 is part of second core network 162, which may also comprise, for example, one or more associated secondary devices 425. The secondary devices may be second communication device 180, which may be an LTE mobile broadband device, and may also comprise other communication devices in second network 160. LTE EPC 404 may further comprise a P-GW 166, which may be operably coupled to the PCRF 176. This may allow the PCRF 176 to adjust QoS, via P-GW 166, based on information received from the application function 430.

In some examples, a user may utilize a primary communication device 447, which may be for example first communication device 150, and one or more associated secondary devices 425, which may be for example second communication device 180. The primary communication device 447 may be operable to communicate with the one or more associated secondary devices 425 via a peer-to-peer link 449. Therefore, in these examples, it may not be necessary to utilize the LMR network zone controller 438 to relay information to the application function 430. In these examples, information relating to current active talk group and associated ISSI information may be forwarded via the peer-to-peer link 449 to the one or more associated secondary devices 425, which may subsequently forward it to the application function 430 via the LTE EPC 404.

Further, in some examples, a user may utilize a single communication device that comprises the functionality of both primary communication device 447 and one or more associated secondary devices 425. Therefore, in these examples, it may also not be necessary to utilize the LMR network zone controller 438.

Referring to operation of the message sequence chart 400, a user may determine that they may need to change the current talk group of their primary communication device 447. In some other examples, where the user has just enabled their primary communication device 447, the device and/or user may determine that an initial talk group or a change from the initial talk group is required. Upon changing talk group, the primary communication device 447 may attach 405 to a talkgroup using the LMR network zone controller 438. In some examples, where there may not be any direct communication between the primary communication device 447 and the one or more associated secondary devices 425, the LMR network zone controller 438 may forward 406 information relating to the currently selected active talk group and ISSI information of the primary communication device 447 to the application function 430. Otherwise, in other examples that may utilize a peer-to-peer link 449 or such like, current active talk group and ISSI information may be transmitted to the application function 430 via the one or more associated secondary devices 425 rather than the LMR network zone controller 438.

In the above example, the one or more associated secondary devices 425 had already attached to, and been authenticated by, the LTE EPC 404, prior to the primary communication device 447 changing talk group. Therefore, the application function 430 may have already been made aware of the one or more associated secondary devices 425 as a result of information stored in third database 340, prior to receiving ISSI and talk group information relating to the primary communication device 447.

Upon receiving talk group and/or ISSI information, the application function 430 may utilize a mapping database in order to map 410 received ISSI information with IMSI information of the one or more associated secondary devices 425.

In some examples, the application function 430 after determining the one or more associated secondary devices 425, may perform procedure 440 for each mapped IMSI of the one or more associated secondary devices 425. The application function 430 also performs procedure 450 for each determined set of active services for each of the one or more associated secondary devices 425.

In this example, the procedure 440 comprises enabling a debounce timer 412 in order to determine whether the user of the primary communication device 447 is in the process of changing 'talk groups' too frequently. If the application function 430 does not receive a further change of talk group from the same primary communication device 447 before the debounce timer expires 414, the application function may continue to procedure 450.

Subsequently, the application function 430 may choose, from a database, a QoS request calculation method 416 based on the user's active talk group, which may take into account talk group ID mapping for supported devices and priorities.

The application function 430 may then calculate QoS request parameters 418, and map the current talk group to a corresponding set of rules allowing a QoS request to be generated.

At 420, the application function 430 may transmit the generated QoS request, which may be a QoS modification request, over a standard Rx interface between the application function 430 and a PCRF of the LTE EPC 404. The QoS request may comprise one or more of; application ID; media type; requested priority; max GBR, IP address; ports; direction; and protocol. In some examples, the application function 430 may transmit a QoS request for each service identified. At 421, calculation/installation/enforcement/termination of the QoS rules occurs at LTE EPC 404.

At 422, upon receiving one or more QoS requests from the application function 430, the LTE EPC 404 may apply QoS rules to the one or more associated secondary devices 405. LTE EPC 404 may calculate QoS parameters, in order to modify existing bearers and modify QoS rules for the one or more associated secondary devices 425. Furthermore, in some examples, the LTE EPC 404 may transmit QoS modification requests to other unassociated devices of other users in order to modify their QoS parameters, which may result in enhanced services for the user of the primary communication device 447.

The invention may allow a user, for example a public safety user, to pass a current LMR context onto an LTE network, and trigger an automatic adjustment of broadband services on the user's associated LTE/mobile broadband device(s). The user may simply switch talk group, via a knob on the LMR device, and all the infrastructure would work behind the scenes to automatically adjust the QoS of an associated or integral LTE/mobile broadband device(s), based on the selected talk group. For example, if the user was responding to an incident, the user may switch to a talk group associated with the incident. As a result, his LTE/mobile broadband devices can begin streaming high quality video in order to assist the user to attend the incident, because the user's device now has QoS parameters allowing the device to support such high quality video streaming. In some other examples, the user may enable, turn-on, his device, wherein his device may initially connect to a talk group. The initial connection to the talk group then causes the infrastructure to receive an indication of a change of talk group. However, when LMR Network Zone Controller 438 requests that the primary communication device 447 joins a talk group, the infrastructure already knows the talk group.

Further, utilizing some examples of the invention, a new application to control QoS may be achieved. For example, talk groups could be created based on many factors including, for example, location, trajectory, proximity to an incident, importance of user etc. Therefore, QoS may be varied for almost any application that a talk group is set up for. Furthermore, utilizing some examples of the invention may allow a trigger, for example dynamic creation of a talk group, to also trigger QoS modification so that all users of the dynamically created talk group may have sufficient access to LTE resources.

It should be noted that although some examples have been implemented with LMR devices and infrastructure, this should not be seen as limiting. Examples of the invention may equally be utilized with any infrastructure that allows group calls to be made.

In some examples, it may be envisaged that the user may be for example a police officer, utilizing a primary LMR radio and multiple secondary LTE devices. These multiple LTE devices may comprise, for example, hand held devices, vehicle terminals, IP cameras, smart watches, or smart glasses etc. In some examples, switching talk group on the user's LMR device may cause QoS modification on all of the user's LTE devices.

When a talk group change or initial selection acts as a trigger to modify QoS for associated devices, it may not be necessary for the LMR or associated LTE devices to transmit jurisdictional status information, or information about whether a user is currently involved in an incident. Therefore, these aspects may not need to be configured and conveyed in the application function in order to make QoS related decisions. Therefore, in some examples, only a change in talk group is required to effect a QoS change in associated LTE devices.

In some examples, one or more 'talk groups' may be setup based on specific user requirements, wherein priorities may be assigned to each of the 'talk groups', defining the level of access (QoS). This may have an advantage of increasing flexibility of the system. Furthermore, a talk group may relate to any factor deemed necessary by the user.

In the foregoing specification, examples have been provided relating to transmitting/receiving an indication of a change in talk group. It should be noted that the change in talk group may be to a talk group with, for example, a higher level of QoS or a lower level of QoS.

Further, transmitting/receiving an indication of a change in talk group may relate to a change in current location, trajectory, proximity to an incident, importance of user etc.

Furthermore, in some examples where there was not an indication of a change from a current talk group i.e. when the device was just enabled, then the indication of a change of a talk group may relate to an initial connection to a talk group.

Figure 5:
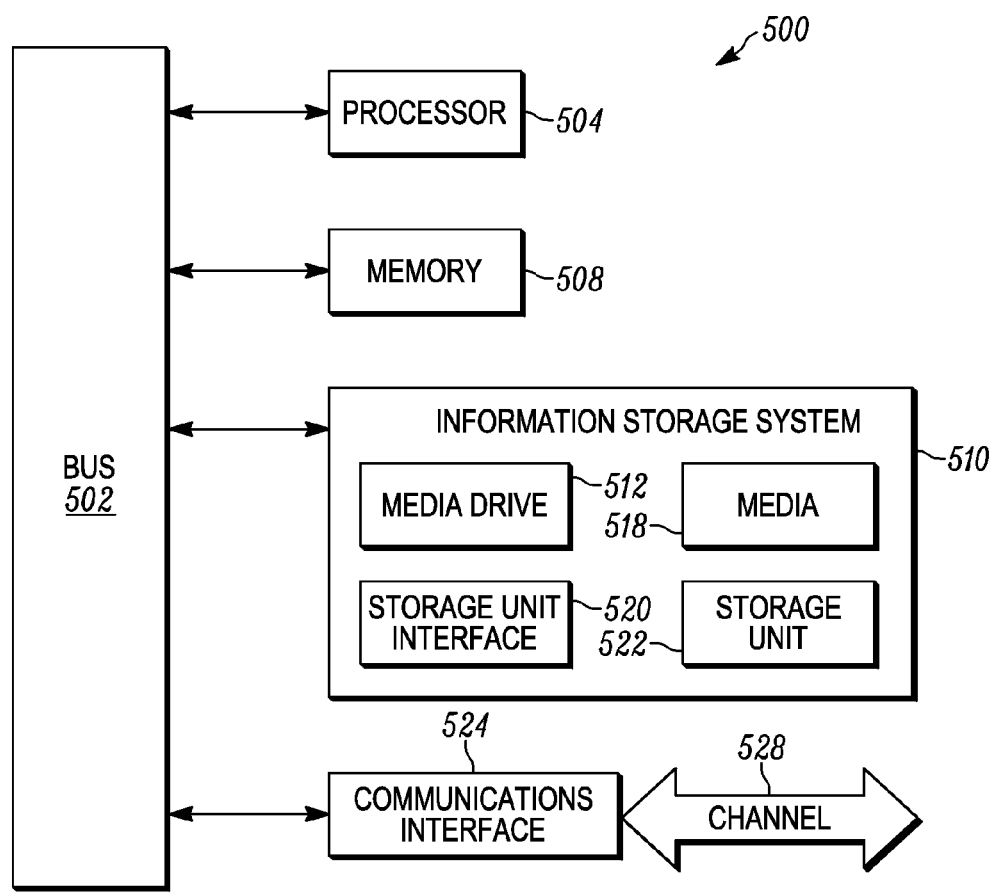
FIG. 5 is a block diagram of a computing system, in accordance with some embodiments.

Referring now to FIG. 5, there is illustrated a computing system 500 that may be employed to implement QoS modification of at least one second communication device 180 associated with a first communication device 150, when the first communication device 150 may has changed its current talk group, or initially attached to a talk group after being switched on. Computing system 500 may be, for example, a desktop, laptop or notebook computer, hand-held computing device (PDA, cell phone, palmtop, etc.), mainframe, server, client, or any other type of special or general purpose computing device. Computing system 500 can include one or more processors, such as a processor 504.

Processor 504 may be a microprocessor, microcontroller or other control logic. Processor 504 is connected to a bus 502 or other communications medium. Computing system 500 includes a main memory 508, such as random access memory (RAM) or other dynamic memory, for storing information and instructions to be executed by processor 504. Main memory 508 may store temporary variables or other intermediate information during execution of instructions to be executed by processor 504. Computing system 500 may include a read only memory (ROM) or other static storage device coupled to bus 502 for storing static information and instructions for processor 504.

The computing system 500 may also include information storage system 510, which may include a media drive 512 and a removable storage unit interface 520. The media drive 512 may include a drive or other mechanism to support a fixed or removable storage media 518, such as a hard disk drive, an optical disk drive, a compact disc, or digital video drive read or write drive. Thus removable storage media 518 includes a computer-readable storage medium having particular computer software or data stored therein.

In some embodiments, information storage system 510 may include a removable storage unit 522, such as a removable memory, a flash memory or other removable memory module. Information storage system 510 may include other removable storage units such as removable storage unit 522, and interfaces such as removable storage unit interface 520, that allow software and data to be transferred from the removable storage media 518 to computing system 500.

Computing system 500 includes a communications interface 524 to allow software and data to be transferred between computing system 500 and external devices. Software and data transferred via communications interface 524 are in the form of signals provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, main memory 508, removable storage media 518, or removable storage unit 522. These and other forms of computer-readable media may store one or more instructions for use by processor 504, to cause the processor to perform specified operations. Such instructions, generally referred to as 'computer program code' (which may be grouped in the form of computer programs or other groupings), when executed, enable the computing system 500 to perform functions of embodiments of the present invention. The code may directly cause processor 504 to perform specified operations, be compiled to do so, and/or be combined with other software, hardware, and/or firmware elements (e.g., libraries for performing standard functions) to do so.

The control logic (in this example, software instructions or computer program code), when executed by the processor 504, causes the processor 504 to perform the functions of the invention as described herein. In one example, a tangible non-transitory computer program product comprises executable program code operable for, implementing QoS modification of at least second communication device 180 associated with first communication device 150, when the primary communication device changes its talk group.

Figure 6:
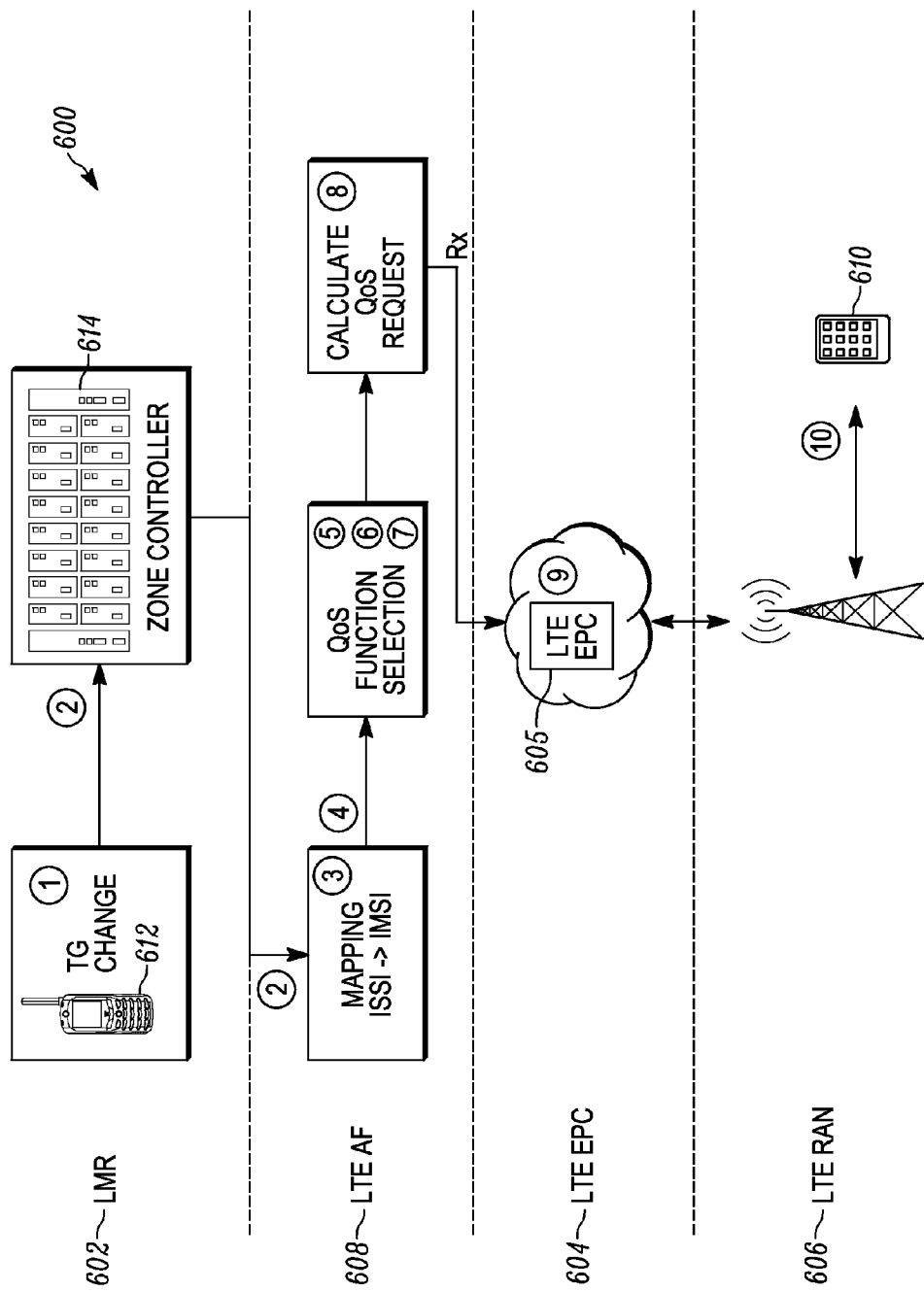
FIG. 6 illustrates a method of setting the Quality of Service of a communication device, in accordance with some embodiments.

FIG. 6 illustrates an example of adjusting QoS for a user's LTE device, such as second communication device 180, based on the user's active talk group in an LMR device, such as first communication device 150. A system 600 is illustrated comprising an LMR region 602, an LTE EPC region 604, with a corresponding LTE RAN region 606, and an application function 608. In this example, application function 608 is situated within a region of the LTE. The application function 608 may be a network element comprising an LMR-LTE gateway and a QoS manager, which may utilize QoS request calculation functions. The QoS request calculation functions may take into consideration inputs received from the LMR region 602, e.g. a talk group, and create QoS requests, which may be transmitted over Rx interfaces to a PCRF.

Initially, as a precondition, an LTE device 610 may have already successfully attached to and been authenticated by the LTE EPC 605. Furthermore, the application function 608 may have established active data links with the LTE device 610 as per the standard SDF establishment procedure.

Subsequently, at '1', the user of the LTE device 610 may 'select' a new talk group on their LMRS radio 612 by, for example, switching to a new talk group. Alternatively, the user may enable their LMRS radio 612 and initially 'select' and attach to an available talk group. The LMRS radio 612 may implement a scan list, which allows the user to listen to the available talk groups on the 'scan list' in addition to their currently selected/main talk group. In this case, the user may select an active talk group by responding to an incoming PTT voice call transmitted on a scanned talk group from the scan list. However LMR network zone controller 128 may instead choose the talk group.

At '2', the LMRS radio 612 may communicate the active talk group selection to zone controller 614, which may relay the active talk group selection to the application function 618 in the LTE network. In some other examples, where the user may be utilizing interconnected or converged devices, talk group selection information can alternatively be transmitted from the LMRS radio 612 through the LTE device 610 to the application function 608.

At '3', the application function 608 identifies LTE device 610 associated with LMRS radio 612, using ISSI-IMSI mapping.

At '4', the application function 608 checks that the talk group selection and/or change is not too frequent. For example, this may be by utilizing a debounce timer.

At '5', the application function 608 selects a method for QoS request calculation, which may be based on but not limited to the user's selected active talk group. In this example, the selection of the method for QoS request calculation takes into account talk group ID mapping to supported services and priorities (refer to Table 1). At '6', the application function 608 determines the set of active services for each LTE device 610 that is associated with the LMRS radio 612. Subsequently, at '7', for each service identified, the application function 608 maps the selected active talk group to a corresponding set of rules, allowing a QoS request to be generated. The QoS request may consist of one or more of: application ID; media type; requested priority; max GBR; IP address; Ports; direction; or protocol.

At '8', the application function 608 transmits, for each service identified, a QoS modification request message to the LTE EPC 605, for the calculation/installation/enforcement of QoS rules. In some examples, the QoS request message may be sent using standard Rx interface between the application function 608 and PCRF within the LTE EPC 605.

At '9', the LTE EPC 605, for example the core, calculates QoS parameters for the user's existing bearers and may modify its QoS rules. Subsequently, at '10', QoS for data links established for each associated LTE device 610 may be updated accordingly. In some examples, QoS for non-associated LTE devices, i.e. LTE devices not associated with the user of the LMRS radio 612, may also be updated.

Figure 7:
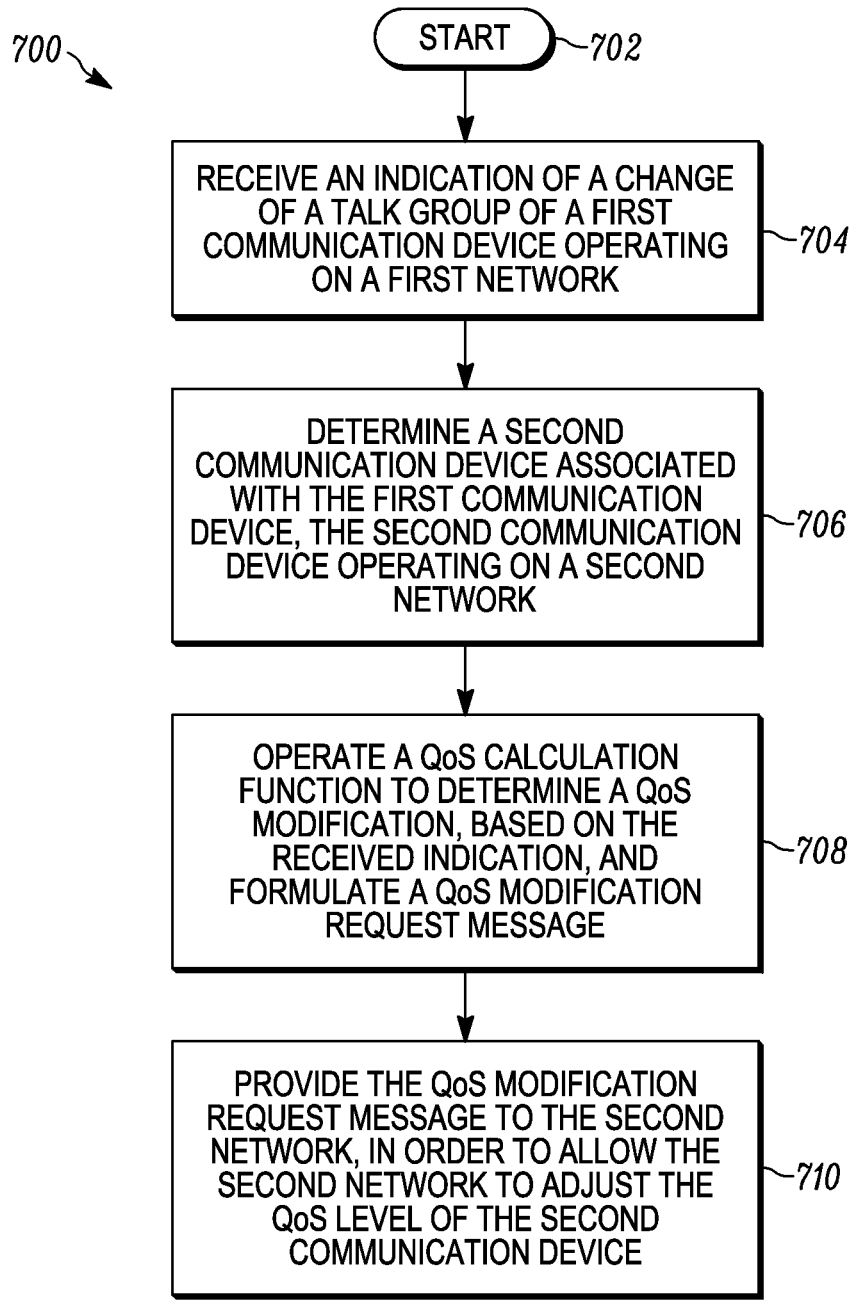
FIG. 7 is a flowchart illustrating a method of adjusting the Quality of Service in a wireless communication system, in accordance with some embodiments.

FIG. 7 illustrates a flow chart 700 of an example operation of adjusting a QoS level in a mobile communication system comprising a first network 110 and a second network 160. In this example, a network entity of the mobile communication system comprises an access gateway and an interface between the network entity and the second network.

Initially at 702, the process starts at the LMR gateway 126. At 704, an indication is received of a change of talk group of a first communication device operating on the first network. In this example, the first communication device may be an LMRS device, and the indication of a change of talk group could relate to a switching talk groups or an initial talk group selection if the first communication device had just been enabled.

At 706, it is determined whether any second communication devices are associated with the first communication device, wherein the second communication device(s) is/are operating on the second network 160.

At 708, a QoS calculation function is utilized to determine a QoS modification based on the received indication. Based on the determination, a QoS modification message is formulated.

At 710, the QoS modification request message is provided to the second network 160, in order to allow the second network 160 to adjust the QoS level of the second communication device 180.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A network entity for determining a Quality of Service, QoS, level in a mobile communication system, the network entity comprising:
an access gateway configured to:
receive an indication of a change of a talk group of a first communication device operating on a first network that is a public safety network, wherein the first communication device is a portable or mobile radio;
determine a second communication device associated with the first communication device, the second communication device operating on a second network;
operate a QoS calculation function to determine a QoS modification, based on the received indication, and formulate a QoS modification request message;
an interface between the network entity and the second network, the interface configured to provide the QoS modification request message to the second network in order to allow the second network to adjust the QoS level of the second communication device; and
wherein the first communication device reports the change of the talk group to the second device via a direct link, and the second device provides the indication of the change of the talk group of the first communication device via the second network to the network entity.

2. The network entity of claim 1, wherein the indication is an indication of a change of a current talk group of the first communication device.

3. The network entity of claim 1, wherein the indication is an indication that the first communication device has switched on and has attached to a particular talk group.

4. The network entity of claim 1, wherein the first network is a public safety network and the first communication device is a portable or mobile radio, and
wherein a zone controller of the public safety network provides the indication of the change of the talk group of the first communication device.

5. The network entity of claim 4, wherein the access gateway is configured to receive information relating to an inter RF subsystem interface, ISSI, of the first communication device.

6. The network entity of claim 5, wherein the access gateway is configured to map the ISSI information to a database of international mobile subscriber identities, IMSIs, whereby the access gateway determines the second communication device associated with the first communication device.

7. The network entity of claim 1, further comprising:
the access gateway being configured to:
based on the indication, determine a plurality of second communication devices associated with the first communication device, the second communication devices operating on the second network;
the interface being configured to provide the QoS modification request message to the second network in order to allow the second network to adjust the QoS level of each of the plurality of second communication devices.

8. The network entity of claim 1, wherein the second network is an LTE network providing broadband to the second device, and
wherein the network entity is implemented as additional functionality in an Application Function (AF) of the second network.

9. The network entity of claim 1, wherein the second network is an LTE network providing broadband to the second device, and wherein the network entity is implemented as a separate stand-alone device, the interface linking the access gateway of the network entity to an Application Function (AF) of the second network.

10. A method for adjusting a Quality of Service, QoS, level in a mobile communication system comprising a first network and a second network, wherein a network entity of the mobile communication system comprises an access gateway and an interface between the network entity and the second network, the method comprising the steps of:

the access gateway:
receiving an indication of a change of a talk group of a first communication device operating on the first network;
determining a second communication device associated with the first communication device, the second communication device operating on the second network;
operating a QoS calculation function to determine a QoS modification, based on the received indication, and formulating a QoS modification request message; and the interface:
providing the QoS modification request message to the second network, in order to allow the second network to adjust the QoS level of the second communication device; and
providing a minimum period between formulating a first QoS modification request message and formulating a second QoS modification request message, or providing a minimum period between transmitting successive QoS modification request messages to the second network, thereby preventing adjustments of the QoS level of the second communication device from being made with a frequency that exceeds an acceptable level.

11. The method of claim 10, wherein the indication is an indication of a change of a current talk group of the first communication device, or an indication that the first communication device has switched on and will attach to a particular talk group.

12. The method of claim 10, further comprising:
setting the minimum period between formulating a first QoS modification request message and formulating a second QoS modification request message, or the minimum period between transmitting successive QoS modification request messages to the second network, such that that two consecutive indications of TG change, for the same device, are not received within the time limit set by a debounce timer.

13. A wireless communication system comprising:
a first communication device operating on a first network;
a second communication device associated with the first communication device and operating on a second network;
a network entity comprising an access gateway and an interface; and
a controller, operable to calculate and apply QoS parameters in the second network;
wherein the access gateway is configured to:
receive an indication of a change of a talk group of the first communication device;
determine the second communication device associated with the first communication device;
determine a QoS modification request message based on the received indication; and wherein the interface is configured to transmit the QoS modification request message to the controller within the second network;
wherein the controller is configured to calculate and apply updated QoS parameters for bearers of the second communication device, based on the received QoS modification request message;
wherein the controller is a Policy and Charging Rules Function, PCRF, configured to transmit updated QoS parameters for one or more bearers of the second communication device to the Policy and Charging Enforcement Function (PCEF) of a Packet Gateway P-GW within the second network, whereby the Policy and Charging Enforcement Function (PCEF) applies the updated QoS parameters within the second network;
wherein the indication of the change in the talk group of the first communication device is forwarded to the network entity by a zone controller in the first network;
wherein the network element comprises an Application Function (AF) in the second network, the second network being an LTE network;
wherein the PCRF comprises an LTE core; and
the LTE core is configured to calculate QoS parameters for a set of active services for the second communication device at least partially on the basis of:
changes that the user requests to currently active services, the currently active services using one or more bearers currently active in the second network;
further services that will be activated later for the second communication device; and/or
services activated during attachment of the device to the second network, whereby the second network will decide whether or not the second communication device can attach immediately, based on whether or not a currently calculated Quality of Service value for the second communication device permits attachment of the second communication device to the second network.

14. The wireless communication system of claim 13 wherein:
the first communication device is a personal mobile radio associated with a user;
the first network is a public safety communications network;
the second communication device is associated with the user; and
the second network is an LTE network operable to provide broadband signals to the second communication device; and
the indication is either:
an indication of a change of a current talk group of the first communication device; or
an indication that the first communication device has switched on and will attach to a particular talk group.

15. The wireless communication system of claim 13, wherein the second communication device is a single multifunctional device, and
the controller is configured to:
calculate and transmit updated QoS parameters for bearers for each function of the second communication device, based on the received QoS modification message.

16. The wireless communication system of claim 13, wherein the second network is an LTE network providing broadband service to the second device, and wherein the network entity is implemented as a separate stand-alone device, the interface linking the access gateway of the network entity to an Application Function (AF) of the second network.

17. The wireless communication system of claim 13, wherein the first communication device operating on the first network and the second communication device operating on the second network form part of a single converged LTE-Land Mobile Radio device, associated with one public safety responder.

* * * * *